United States Patent
Martin et al.

(10) Patent No.: US 10,260,195 B1
(45) Date of Patent: *Apr. 16, 2019

(54) NANOCLAY-MODIFIED FABRICS FOR FLAME RETARDATION

(71) Applicant: Precision Custom Coatings LLC, Totowa, NJ (US)

(72) Inventors: Christopher Keith Martin, Wayne, NJ (US); Aneta Konior, Oak Ridge, NJ (US)

(73) Assignee: Precision Textiles LLC, Totowa, NJ (US)

( * ) Notice: Subject to any disclaimer, the term of this patent is extended or adjusted under 35 U.S.C. 154(b) by 78 days.

This patent is subject to a terminal disclaimer.

(21) Appl. No.: 14/877,611

(22) Filed: Oct. 7, 2015

Related U.S. Application Data

(63) Continuation-in-part of application No. 14/273,123, filed on May 8, 2014.

(60) Provisional application No. 62/090,036, filed on Dec. 10, 2014.

(51) Int. Cl.

| | |
|---|---|
| *D06M 11/00* | (2006.01) |
| *D06M 11/77* | (2006.01) |
| *D06M 15/263* | (2006.01) |
| *C09D 133/00* | (2006.01) |
| *C08K 3/34* | (2006.01) |
| *A47C 31/00* | (2006.01) |
| *D06M 101/06* | (2006.01) |
| *D06M 101/16* | (2006.01) |

(52) U.S. Cl.
CPC ............ *D06M 11/77* (2013.01); *A47C 31/00* (2013.01); *C08K 3/346* (2013.01); *C09D 133/00* (2013.01); *D06M 15/263* (2013.01); *D06M 2101/06* (2013.01); *D06M 2101/16* (2013.01); *D06M 2200/30* (2013.01)

(58) Field of Classification Search
CPC .. A41C 31/001; D06M 11/77; D06M 2200/30
See application file for complete search history.

(56) References Cited

U.S. PATENT DOCUMENTS

| | | | |
|---|---|---|---|
| 4,230,746 A | 10/1980 | Nahta | |
| 4,555,811 A | 12/1985 | Shimalla | |
| 5,011,731 A | 4/1991 | Nakamori et al. | |
| 6,492,574 B1 * | 12/2002 | Chen ................. | A61F 13/47218 604/378 |
| 6,669,882 B2 | 12/2003 | Seok | |
| 6,893,492 B2 | 5/2005 | White et al. | |
| 7,225,487 B2 | 6/2007 | Small, Jr. et al. | |
| 7,365,032 B1 | 4/2008 | Adachi et al. | |

(Continued)

FOREIGN PATENT DOCUMENTS

| | | |
|---|---|---|
| DE | 845230 C | 7/1952 |
| DE | 10115941 | 6/2006 |
| GB | 338654 A | 11/1930 |

OTHER PUBLICATIONS http://coatingsys.com/pdf/What%20are%20the%20applications%20of%20nano%20clay%20as%20filler%20in%20coatin%20E2%80%A6.pdf.*

(Continued)

*Primary Examiner* — Arti Singh-Pandey
(74) *Attorney, Agent, or Firm* — Greenberg Traurig, LLP

(57) ABSTRACT

A flame-retardant fabric comprises a textile substrate having a layer of a nanoclay material extending along a surface of the textile substrate and integrated with the textile substrate.

17 Claims, 6 Drawing Sheets

(56) References Cited

U.S. PATENT DOCUMENTS

| | | | |
|---|---|---|---|
| 7,638,192 B2* | 12/2009 | Murphy | A47C 31/001 428/359 |
| 7,858,542 B2 | 12/2010 | Mio et al. | |
| 8,236,712 B2 | 8/2012 | Jones et al. | |
| 8,367,203 B2 | 2/2013 | Rüf et al. | |
| 9,469,935 B1 | 10/2016 | Martin et al. | |
| 2003/0206979 A1 | 11/2003 | Dvoracek | |
| 2004/0033352 A1 | 2/2004 | Massa | |
| 2004/0097156 A1 | 5/2004 | McGuire et al. | |
| 2004/0102112 A1 | 5/2004 | McGuire et al. | |
| 2004/0106347 A1 | 6/2004 | McGuire et al. | |
| 2004/0185731 A1 | 9/2004 | McGuire | |
| 2004/0226100 A1 | 11/2004 | Small, Jr. et al. | |
| 2005/0164582 A1 | 7/2005 | McGuire et al. | |
| 2006/0000024 A1 | 1/2006 | McGuire et al. | |
| 2006/0046028 A1* | 3/2006 | Kaminski | B32B 5/022 428/143 |
| 2008/0050565 A1* | 2/2008 | Gross | B32B 5/22 428/212 |
| 2008/0153975 A1 | 6/2008 | Lubnin | |
| 2012/0258643 A1 | 10/2012 | Rüff et al. | |
| 2012/0295031 A1 | 11/2012 | Grunlan | |
| 2013/0014672 A1 | 1/2013 | Martin et al. | |
| 2015/0337204 A1* | 11/2015 | Yamazaki | C08K 5/053 524/100 |

OTHER PUBLICATIONS

Byk-Chemie GrnbH, Technical Information B-RI 10, Cloisite, Nanocomposite Additive for Halogen-free Flame Retardants, pp. 1-3.

U.S. Appl. No. 14/273,123 entitled "Enhancing Flame Retardant Characteristics of High-Loft Fabric Fire Barriers," filed May 8, 2014.

Compositology, LLC, Nanotechnology News, University of Maryland and NIST Working on Nanoclay FR System. Retrieved online: Sep. 19, 2016, http://www.compositology.com/news/industry_news/nanotechnology-industry_news/umd-nist-nanoclay-fr/.

Lenzing Group, "Sustainability in the Lenzing Group", Retrieved Jan. 4, 2017, <http://www.lenzing.com/sites/nh/english/images/pdf/english/prozesse_e.pdf>.

BASF performance mineral extenders for coatings and inks, no date available.

Flammschutz Online, Intumescent Flame Retardant Systems_ Retrieved online: Sep. 19, 2016, http://www.flameretardants-online.com/web/en/106/110 .htm.

U.S. Appl. No. 15/040,490, entitled "Nanoclay-Modified Fabrics for Flame Retardation", filed Feb. 10, 2016.

U.S. Appl. No. 15/243,475 entitled "Enhancing Flame Retardant Characteristics of High-Loft Fabric Fire Barriers", filed Aug. 22, 2016.

U.S. Appl. No. 15/454,652 entitled "Nanoclay-Modified Fabrics for Flame Retardation", filed Mar. 9, 2017.

* cited by examiner

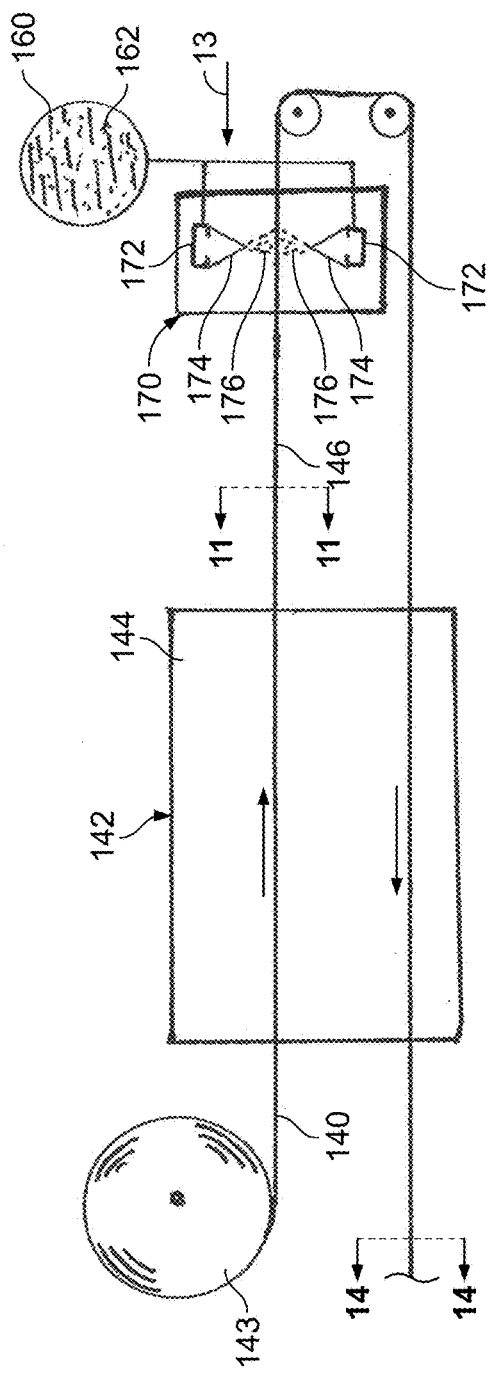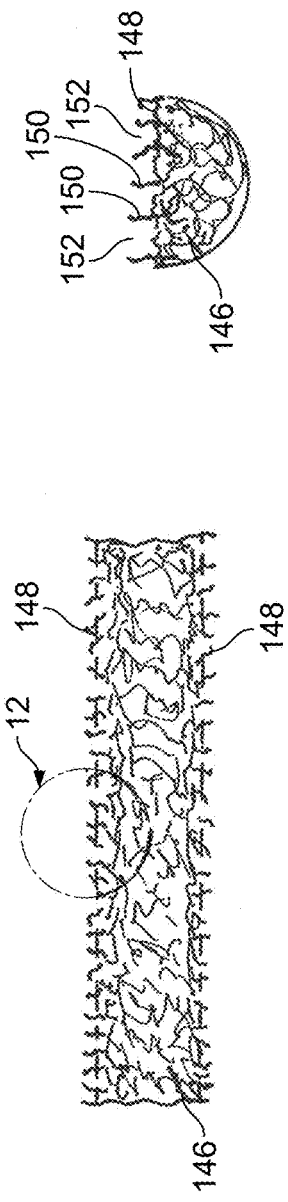
FIG. 10
FIG. 11
FIG. 12

NANOCLAY-MODIFIED FABRICS FOR FLAME RETARDATION

CROSS-REFERENCE TO RELATED APPLICATIONS

The present application is a continuation-in-part of U.S. patent application Ser. No. 14/273,123, filed on May 8, 2014, and claims the benefit of U.S. Provisional Patent Application No. 62/090,036, filed on Dec. 10, 2014, both of which applications are incorporated by reference herein in their entireties.

FIELD OF THE INVENTION

The present invention relates to the field of flame-resistant fabrics, more specifically, to enhancements for improving the flame resistance of such fabrics and the flame resistance of items incorporating such fabrics.

BACKGROUND OF THE INVENTION

Each year, thousands of residential fires are caused in the United States by the ignition of mattresses and bedding, resulting in hundreds of deaths and hundreds of millions of dollars in property losses. Heightened awareness of fire prevention has led to the development of standards and regulations directed to the reducing the likelihood that such fires will occur. One approach to reducing the likelihood of residential fires is to use flame-resistant fabrics as flame barriers in mattresses and bedding.

Conventional techniques for preparing flame-resistant fabrics include the use of inherently flame-resistant fibers, the chemical treatment of fibers or fabrics with flame retardant chemicals, and the incorporation of additives into the fiber matrix as the fiber is formed. Examples of inherently flame-resistant fibers include polyester fibers, polyaramid fibers, melamine fibers, and polybenzimidazole fibers. Chemical treatments include the impregnation or topical application of heat dissipaters (e.g., aluminum hydroxide or magnesium hydroxide) or free-radical quenchers (e.g., chemical compounds containing boron, phosphorous, nitrogen, antimony, or halogens). Additives that may be incorporated into the matrix of the fibers include some of the aforementioned chemical compounds, and silica as sodium silicate.

SUMMARY OF THE INVENTION

A first embodiment of the present invention includes textile fibers modified by incorporation of a nanoclay into the matrix of the fibers. In such an embodiment, the fibers may incorporate inherently flame-resistant polymers and/or cellulosic materials.

A second embodiment of the present invention includes methods of incorporating a nanoclay into textile fibers. In such an embodiment, the nanoclay may be mixed into a flowable polymer or solution of polymeric precursors, which is then extruded to form the clay-modified fibers.

A third embodiment of the present invention includes a woven or non-woven textile fabric modified by application to the fabric of a flowable coating material that includes a nanoclay. In such an embodiment, the flowable coating material may include a latex binder and the nanoclay as a suspension.

A fourth embodiment of the present invention is a coating material for textiles that includes a nanoclay. In such an embodiment, the coating material includes the nanoclay and a latex binder in a suspension.

A fifth embodiment of the present invention includes a woven or non-woven textile fabric that includes textile threads incorporating a nanoclay, the fabric also having a coating that includes a nanoclay. In such an embodiment, the fabric may be a filler cloth for a mattress.

A sixth embodiment of the present invention includes an article of manufacture incorporating a textile fabric of the present invention. In such an embodiment, the article may be a mattress.

BRIEF DESCRIPTION OF THE FIGURES

For a more complete understanding of the present invention, reference is made to the following detailed description of exemplary embodiments considered in conjunction with the accompanying drawings, in which:

FIG. 10 is a diagrammatic depiction of an apparatus conducting a method of manufacture of a high-loft fabric fire barrier constructed in accordance with the present invention;

FIG. 11 is an enlarged, fragmentary cross-sectional view taken along line 11-11 of FIG. 10;

FIG. 12 is a further enlarged fragmentary cross-sectional view of a portion of FIG. 11, designated by arrow 12 in FIG. 11;

DETAILED DESCRIPTION OF THE INVENTION

An embodiment of the present invention includes textiles and textile fibers modified by incorporation of nanoclays (also referred to herein as "clay nanoparticles") into the matrix of the fibers. As understood in a number of arts, the term "nanoclays" may refer to clays that are primarily formed from the layered aluminosilicate minerals known as phyllosilicates. Phyllosilicates delaminate in aqueous media to form platelets having thicknesses as small as 1 nm, and lateral dimensions (i.e., length and width) in ranges from tens of nanometers to hundreds of nanometers, or into the micron range. For the purpose of the present disclosure, the term "nanoclays" includes such phyllosilicates, as well as other mineral particles having at least one dimension that is in the range of about 1 nm to hundreds of nanometers. Exemplary nanoclays that may be used in embodiments of the present invention include, without limitation, bentonites, montmorillonites, hectorites, illites, and kaolinites. Organically-modified nanoclays may also be used in embodiments of the present invention.

Figures 1, 2:
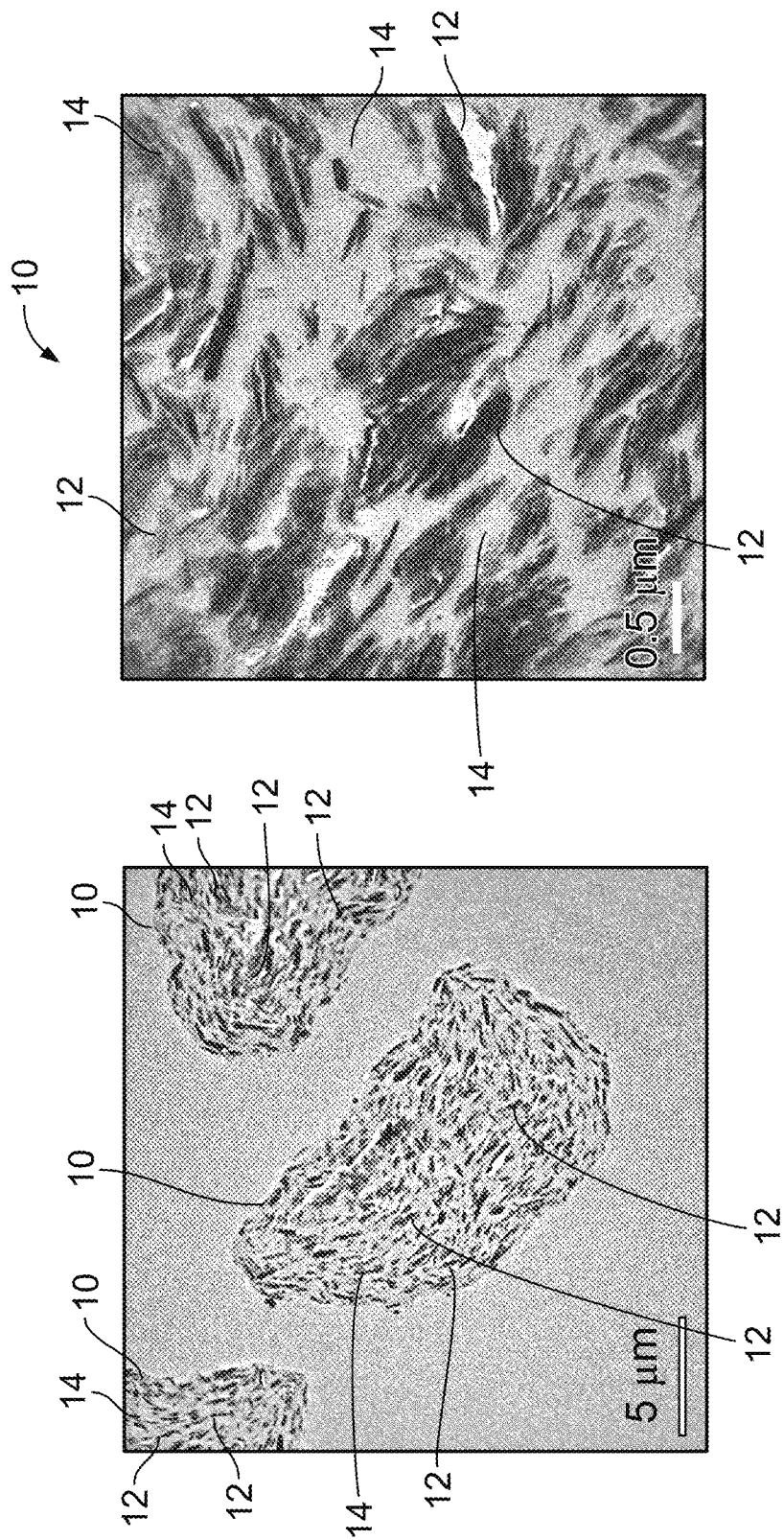
FIG. 1 is a scanning electron microscopic image (SEM) of cross-sections of nanoclay-modified textile fibers according to an embodiment of the present invention.
FIG. 2 is a second SEM of another cross-section of a nanoclay-modified textile fiber according to the embodiment of FIG. 1.

One embodiment of the present invention includes a nanoclay-modified textile fiber. In such an embodiment, the textile fiber is an extruded fiber, such as viscose rayon. Referring to FIGS. 1 and 2, nanoclay-modified textile fibers 10 according to an embodiment of the present invention have nanoclay particles 12 distributed throughout the fiber matrix 14.

In a method of making such fibers, according to an embodiment of the present invention, the nanoclay may be mixed or dispersed into a flowable polymer or solution of polymeric precursors, which is then extruded to form the clay-modified fibers. Conventional extrusion methods or modifications of conventional extrusion methods may be used to form the fibers. In an embodiment of the present invention, the flowable polymer is cellulose of a type used to make viscose rayon. In an exemplary embodiment, the nanoclay content of the fiber is no more than 80% w/w. In an exemplary embodiment, the nanoclay content of the fiber is in the range of about 60% w/w to about 70% w/w. In an exemplary embodiment, the fiber is a viscose rayon fiber and the nanoclay is kaolin or kaolinite.

Figure 3:
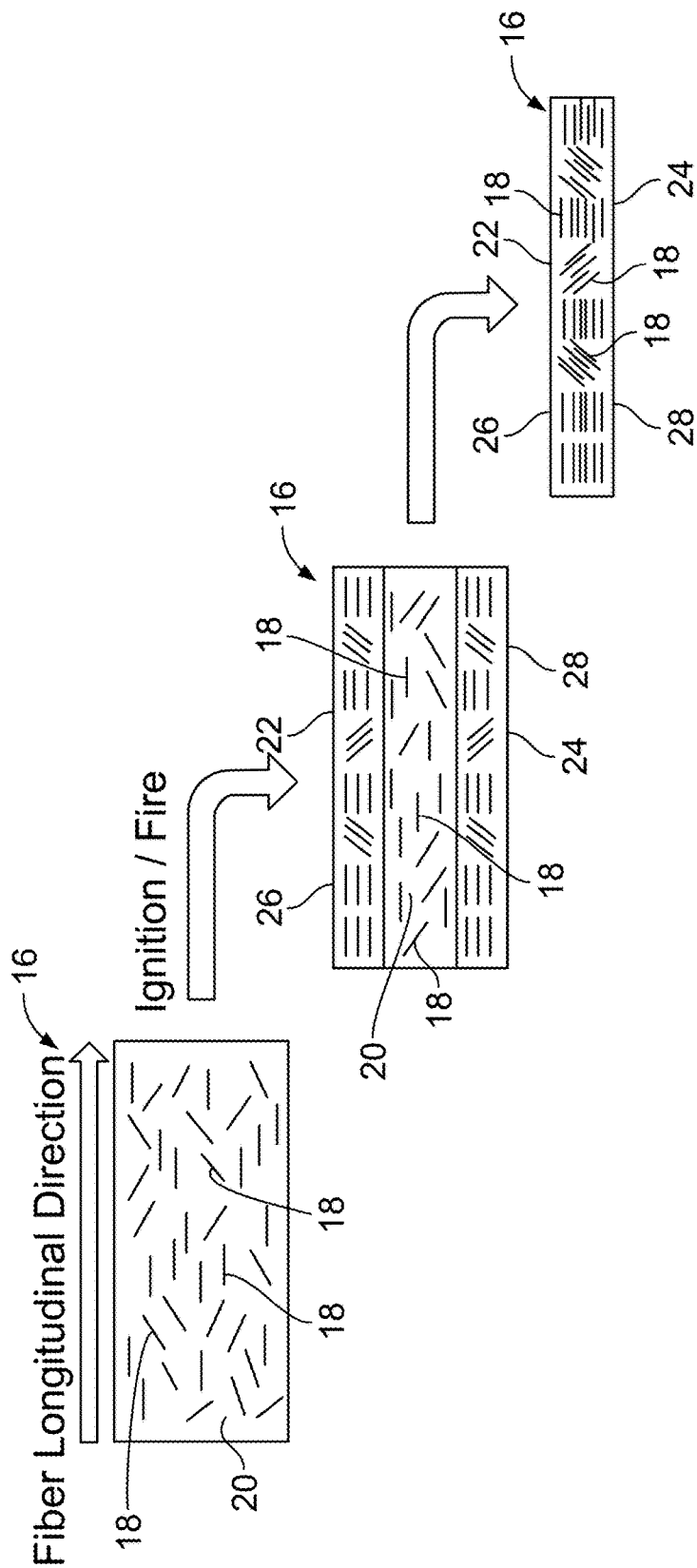
FIG. 3 is a schematic process diagram of the burning behavior of a nanoclay-modified fiber of the same general type as the fiber of FIG. 1.

FIG. 3 is a schematic process diagram of the burning behavior of a nanoclay-modified fiber 16 according to an embodiment of the present invention. The fiber 16 comprises nanoclay particles 18 in a cellulosic matrix 20. As a conventional cellulosic fiber (not shown) burns, it generally forms a char and releases gaseous decomposition products. When the nanoclay-modified fiber 16 is ignited, the nanoclay particles 18 migrate from the degraded matrix 20 to the fiber surfaces 22, 24, forming barriers 26, 28 to mass and heat transport. The nanoclay-filled barrier 26, 28 itself is non-combustible, and provides structural reinforcement to the charred fiber 16.

Figure 4:
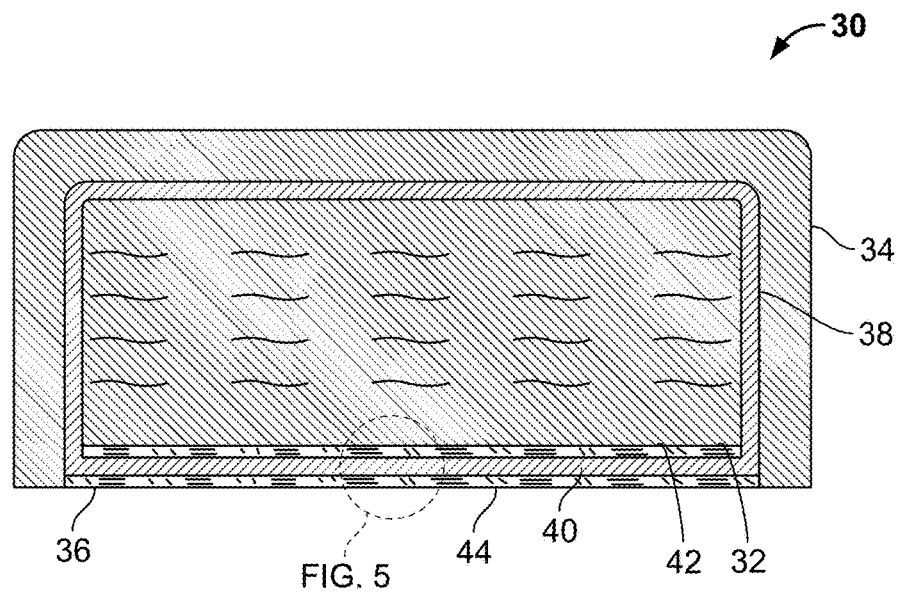
FIG. 4 is a schematic cross-sectional diagram of a mattress constructed in accordance with an embodiment of the present invention.

Another embodiment of the present invention includes a woven or non-woven textile fabric modified by application of a nanoclay-filled coating material to the fabric. FIG. 4 illustrates an arrangement of fabrics used in a non-flip mattress 30 in a schematic cross-sectional view. The non-flip mattress 30 includes a non-fabric core 32, which may be of any known type used in non-flip mattresses in general or of types yet to be developed. The core 32 is surrounded by mattress ticking 34, which may be of any known type or of types yet to be developed, and a filler cloth 36 including a textile fabric according to an embodiment of the present invention. A fabric fire barrier 38 is provided between the ticking 34 and core 32. In mattresses according to embodiments of the present invention, one or both of the filler cloth 36 and the fabric fire barrier 38 are fire-resistant fabrics according to embodiments of the present invention. Further, the arrangement of fabrics in the mattress of FIG. 4 and similarly-arranged mattresses according to embodiments of the present invention may be readily adapted to reversible mattresses (not shown) in arrangements understood in the prior art or yet to be developed. Yet further, filler cloths or fabric fire barriers such as those shown in FIGS. 4 and 5, or discussed elsewhere herein, may be used in other household furnishings (e.g., without limitation, mattress foundations or upholstered furniture) in arrangements known in the art or yet to be developed.

Figure 5:
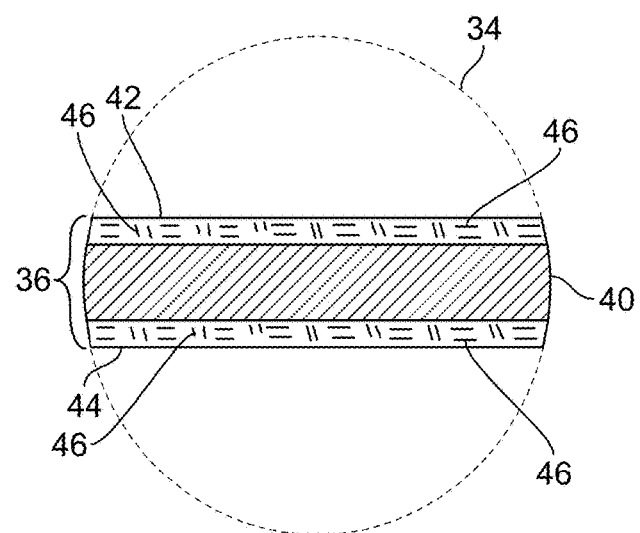
FIG. 5 is a schematic fragmentary view of a portion 5 of the mattress of FIG. 4.

FIG. 5 is a detail of the filler cloth 36, which is an embodiment of the fire-resistant fabric of the present invention. The filler cloth 36 includes a textile substrate 40, and upper and lower coatings 42, 44, each of which extends along a respective surface of the textile substrate 40 and is integrated with the textile substrate 40. In embodiments of the present invention, the upper coating 42 and/or the lower coating 44 each extends along a respective surface of the textile substrate 40 and is integrated with the textile substrate 40. Filler cloth 36 is an exemplary embodiment of the flame-retardant fabrics of the present invention, which also include fire barriers, such as fire barrier 38, and other coated flame-retardant fabrics.

In embodiments of the present invention, the textile substrate 40 includes a woven or non-woven textile containing at least cellulosic fibers (not shown). The cellulosic fibers may be fire-resistant cellulosic fibers, such as fire-resistant rayon (e.g., viscose) fibers, or non-fire-resistant cellulosic fibers. Fire-resistant nanoclay-modified fibers according to embodiments of the present invention are one of the types of fire-resistant fibers that may be used in the fire-resistant fabric of the present invention. Other types of fire-resistant fibers known in the art or yet to be developed may also be used in the fire-resistant fabric of the present invention, including, without limitation, silica-modified fibers, chemically-treated fibers, polyester fibers, and thermoplastic polymeric fibers. In an embodiment, the textile substrate 40 is a blend of cellulosic fibers and thermoplastic polymeric fibers. In an embodiment, the cellulosic fibers constitute from about 60% to about 90% of the textile substrate 40, with the balance of the textile substrate being thermoplastic polymer fibers. In an embodiment, the textile substrate 40 is one of a 60/40 blend, a 65/35 blend, a 70/30 blend, a 75/25 blend, an 80/20 blend, an 85/25 blend, and a 90/10 blend of cellulosic fibers/thermoplastic fibers. The selection and manufacture of appropriate textile substrates for use in the present invention will be understood by those having ordinary skill in the art and possession of the present disclosure.

In embodiments of the present invention, coatings 42, 44 are latex coatings filled with nanoclay particles 46. In other embodiments of the present invention (not shown), one of the upper and lower coatings 42, 44 contains nanoclay particles 46 and the other does not. In yet other embodiments of the present invention, the filler cloth 36 has only an upper coating 42 or a lower coating 44.

In embodiments of the present invention, the coatings 42, 44 are applied to the textile substrate 40 as flowable coating materials. In embodiments of the present invention, such flowable coating materials include a solvent (e.g., water), a binder (e.g., a latex binder), and nanoclay particles. In some embodiments, the flowable coating materials further include a pigment. In some embodiments, the flowable coating materials further include auxiliary chemistries, such as wetting agents, surfactants, or pigment stabilizers. The selection and use of appropriate solvents, binders, pigments, and auxiliary chemistries will be understood by those having ordinary skill in the art and possession of the present disclosure.

In embodiments of the present invention, the flowable coating material has a composition in which the nanoclay is present in the coating material in the range of about 1% to about 30% by weight. In some embodiments, the nanoclay is present in the flowable coating material in range of about 10% to about 20% by weight. Workable flowable coating materials have been discovered that include from about 10% to about 20% bentonite by weight in an aqueous suspension with about 5% acrylic latex as a binder. The total solids content of such workable coating materials is roughly 50% w/w. The foregoing amounts of nanoclay, binder, and other solids may be varied without departing from the scope and spirit of the invention, as will be understood by those having ordinary skill in the art and possession of the present disclosure.

Continuing to refer to FIG. 5, in embodiments of the present invention, the flowable coating material is applied to the textile substrate 40 to form the coatings 42, 44. The flowable coating material may be applied to the textile substrate 40 by one or more of processes known in the art or yet to be developed for applying flowable materials to sheets. Such methods include, without limitation, dip coating processes, spray coating processes, slot coating processes, and foam coating processes. Foam coating processes have been found to be particularly effective in applying the coating materials of the present invention to textiles. In an embodiment, the flowable coating material includes a liquid carrier, and the liquid carrier is driven off from the coatings 42, 44 after the flowable coating material is applied to the textile substrate.

In exemplary embodiments of the present invention, the nanoclay is present in the filler cloth 36 in an amount of about 20% by weight of the filler cloth 36. In exemplary embodiments of the present invention, the nanoclay is present in the filler cloth 36 in an amount in the range of about 0.005% about 20% by weight of the filler cloth 36. In exemplary embodiments of the present invention, the nanoclay is present in the filler cloth 36 in an amount in the range of about 0.005% to about 10% by weight of the filler cloth 36. In exemplary embodiments of the present invention, the nanoclay is present in the filler cloth 36 in an amount in the range of about 1% to about 3% by weight of the filler cloth 36, although, in some embodiments, the nanoclay is present in the filler cloth 36 in an amount of up to about 5% of the filler cloth 36. The amounts of coating material and/or nanoclay added to the textile may be varied without departing from the scope and spirit of the invention, as will be understood by those having ordinary skill in the art and possession of the present disclosure. In an embodiment of the present invention, the coated fabric has a weight in the range of 2 ounces per square yard to 8 ounces per square yard.

Referring now to FIGS. 10 through 14, manufacture of fire barrier 120 in accordance with the present invention is depicted diagrammatically in FIG. 10 wherein it is seen that a blend of non-woven inherently flame retardant cellulosic fibers and thermoplastic polymeric fibers in the form of a continuous batt 140 is advanced through an apparatus 142, from a supply roll 143, into an oven 144 where the blend of fibers within batt 140 is bound into a high-loft fabric that emerges from the oven 144 in the form of a sheet 16 that includes opposite filamentous surfaces 148. As best seen in FIGS. 11 and 12, the filamentous nature of surfaces 148 is a result of fibers of the batt 140 projecting from the batt 140 in the form of a multitude of filaments 150, with interstices 152 between the filaments 150.

Figure 13:
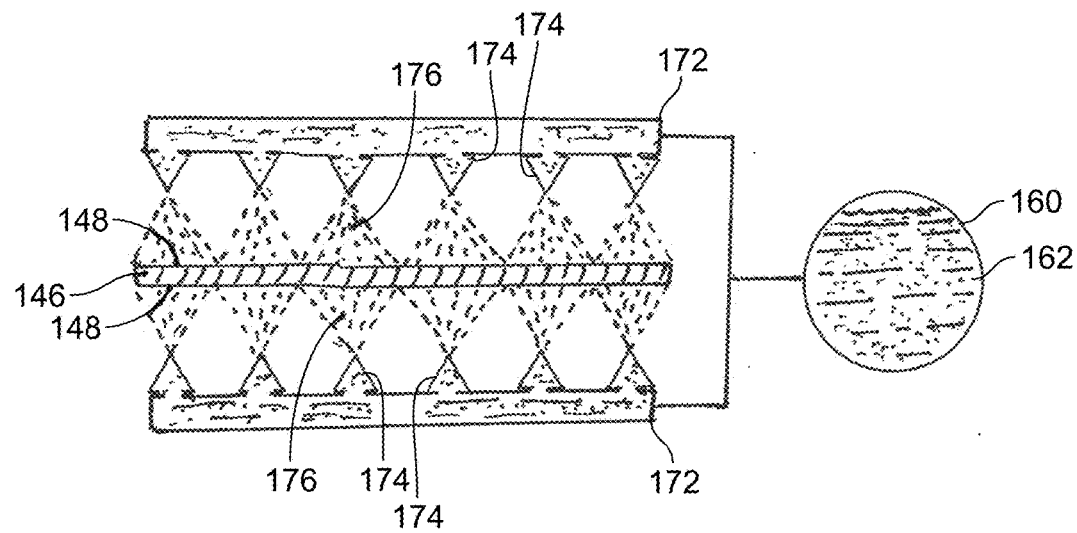
FIG. 13 is a diagrammatic, fragmentary view taken in the direction of arrow 13 in FIG. 10.

Apparatus 142 includes a supply 160 of a dispersion 162 of finely divided nanoclay material dispersed within a liquid carrier, the preferred liquid being water. The sheet 146 is passed to a station 170 where dispersion 162 is applied to each surface 148 of sheet 146, preferably through respective banks 172 of spray heads 174 which direct a fine mist spray 176 to each corresponding surface 148, as seen in FIG. 13. The fine mist spray 176 assures that the dispersion 162 enters the interstices 152 between the filaments 150 or sheet 146.

Figure 14:
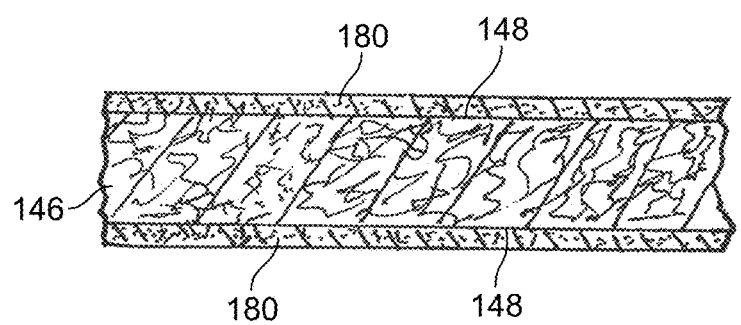
FIG. 14 is an enlarged, fragmentary cross-sectional view taken along line 14-14 of FIG. 10.

Upon leaving station 170, sheet 146 is directed back into oven 144 where the liquid carrier of the dispersion 162 within the interstices 152 is driven off, leaving nanoclay material deposited within the interstices 152 to be integrated with the sheet 146, in a layer 180 of nanoclay material extending along each surface 148 of the sheet 146, as seen in FIG. 14. The sheet 146 is then ready for dividing into appropriately dimensioned fire barriers 38 in which layers 42, 44 of nanoclay material extend along the corresponding upper and lower surfaces of the substrate 40, and are integrated with the substrate 40. The layers 42, 44 of nanoclay material provide the fire barrier 38 with lowered thermal transmission properties as compared to previous fabric fire barriers. In addition, by virtue of filling the interstices with nanoclay material, the filamentous nature of the surfaces of the substrate 40 is substantially reduced, and preferably eliminated, producing a concomitant reduction in flame propagation across the completed fire barrier 38.

It will be seen that the present invention attains all of the objects and advantages summarized above, namely: establishes enhanced flame retardant characteristics in high-ion fabric fire barriers constructed of non-woven inherently flame retardant fibers; provides high-loft fabric fire barriers of exceptional strength, durability and superior flame retardant characteristics; enables the economical manufacture of high-loft fabric fire barriers that exhibit exemplary performance, especially in the construction of mattresses, as well as in domestic bedding and upholstered items; utilizes inherently flame retardant fibers together with nanoclay material for attaining enhanced flame retardant characteristics for exemplary flame retardant performance in the nature of lower thermal transfer and reduced flame propagation, coupled with durability and strength, together with desirable physical characteristics, without the necessity for additional coating operations, or otherwise adding flame retardant chemistry, in order to attain requisite flame retardant properties; simplifies the manufacture of fabric fire barriers exhibiting a high degree of flame retardant performance, utilizing relatively simple, conventional manufacturing techniques; provides highly reliable flame retardant performance in high-loft fabric fire barriers and the like, intended for rugged, long-term service; provides a mattress construction that exhibits enhanced flame retardant characteristics; makes available a wide variety of economical fabric fire barriers for exemplary performance over an extended service life.

Further embodiments of coated filler cloths and other coated textile fabrics according to the present invention, as well as articles of manufacture incorporating such coated textile fabrics, are disclosed in U.S. patent application Ser. No. 14/273,123, filed on May 8, 2014, which is incorporated by reference herein in its entirety.

The following example is presented to demonstrate that nanoclay-modified fabrics of the present invention present superior reduction of thermal transfer and less shrinkage than coated fabrics without nanoclay.

Example

Samples of a non-woven textile were coated with one of two coatings (i.e., Coating 1 and Coating 2) by a foam coating process. Coating 1 was an aqueous suspension having roughly 50% solids by weight, including a pigment, about 5% acrylic latex by weight as a binder, and auxiliary chemistry. Coating 2 had the same composition as Coating 1, except that it included about 10% bentonite (CLOISITE NA+, BYK Additives, Inc., Gonzales, Tex.) by weight. The coatings were applied to a stitch-bonded, non-woven blend of silica-filled FR rayon fibers (65%) and polyester fibers (35%).

Figure 6:
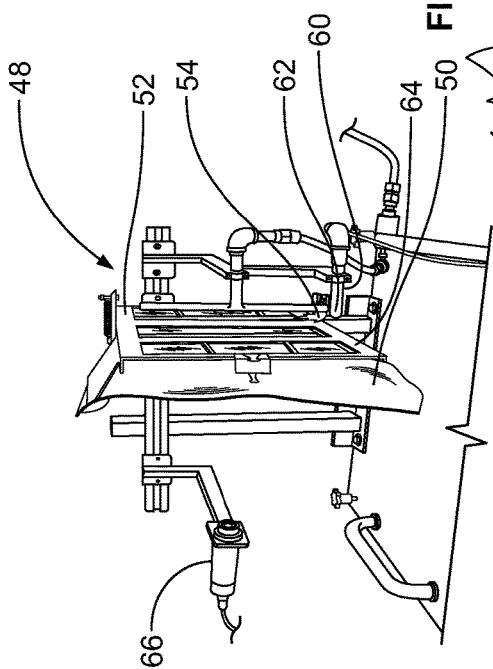
FIG. 6 is a reproduction of a photograph of an apparatus used for a vertical test burn of a fabric sample.
Figure 7:
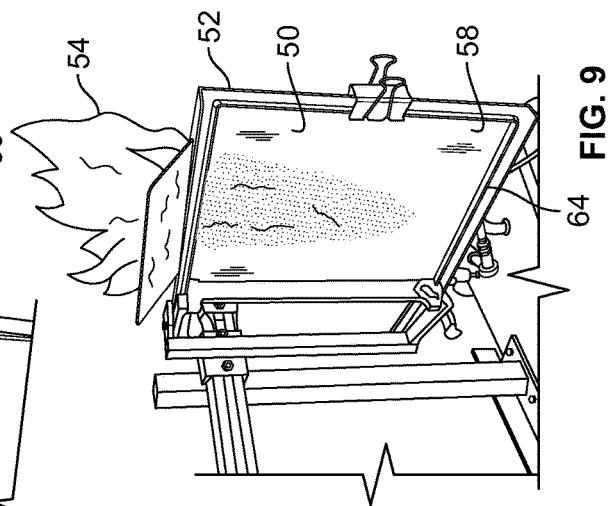
FIG. 7 is a reproduction of a photograph of the apparatus of FIG. 6 with a fabric sample secured in a sample frame of the apparatus.
Figure 8:
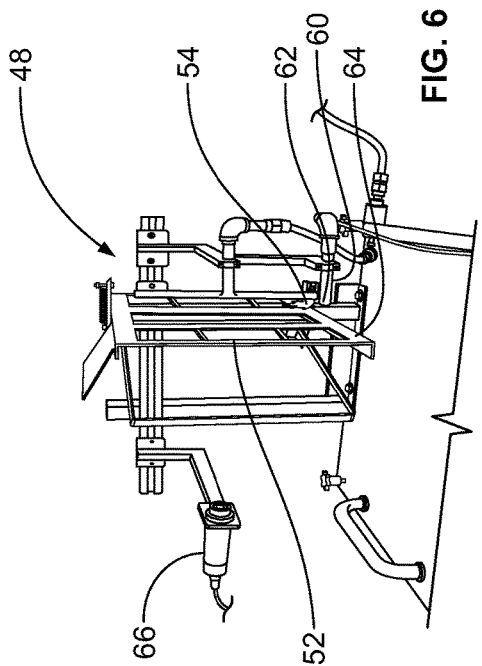
FIG. 8 is a reproduction of a photograph of a first view of a vertical test burn using the apparatus of FIG. 6.
Figure 9:
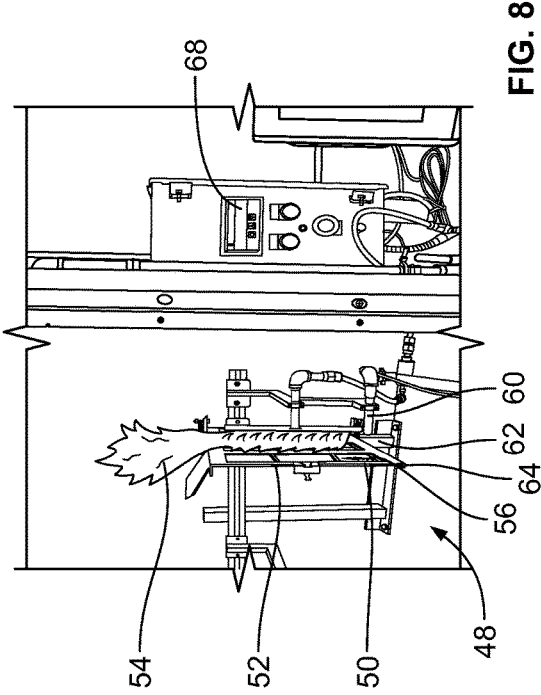
FIG. 9 is a reproduction of a photograph of a second view of the vertical test burn of FIG. 8.

The thermal transfer and shrinkage of the coated fabrics were tested using a vertical-burn test. FIG. 6 is a photographic image of the test apparatus 48 used to conduct the vertical burn test. FIG. 7 is a photographic image of a test sample 50 of a fabric mounted on a sample frame 52 of the test apparatus 48 of FIG. 6. FIG. 8 is a view of a vertical burn test of the test sample 50, wherein the flame 54 is seen at the front side 56 of the test sample 50. FIG. 9 is a view of the vertical burn test of test sample 50 viewed from the back side 58 of the test sample 50. Referring to FIGS. 6-9 collectively, the test apparatus 48 also includes a gas jet 60 having an outlet 62 positioned near the bottom 64 of the sample frame 52, a non-contact infrared temperature sensor 66 for measuring the temperature at the back side 58 of the test sample 50 (i.e., the side of the test sample 50 opposite the flame 54), an infrared temperature display 68 for reporting the temperature measured by the temperature sensor 66, and a mass flow controller (not visible) for controlling the flow rate of propane gas through the gas jet 60. These and other components of the test stand will be recognized and understood from FIGS. 6-9 by those having ordinary skill in the art, since the test apparatus 48 is similar to apparatuses known in the industry for use in test burns.

The test burn procedure used is discussed herein. After preparing and calibrating the test apparatus 48, a fabric sample 50 measuring 12 inches by 12 inches is cut from a roll of coated fabric, and secured in the sample frame 52. Liquid propane gas is delivered to a flame 54 at the outlet 62 of the gas jet 60 at a rate of about 5.1 liters per minute. The front side 56 of the test sample 50 is exposed to the flame 54 for 50 seconds, while the temperature at the back side 58 of the test sample 50 is measured and recorded. At the end of the burn, the test sample is allowed to cool and is examined. The maximum recorded temperature is reported, as well as any excessive charring, glowing, flaming, or shrinkage that was observed.

The results of the tests performed on fabrics prepared with Coating 1 or Coating 2 are presented in Table 1, wherein:

"N" is the number of samples tested;

"weight" is the average weight of the samples, reported in ounces per square yard (osy);

"thickness" is the average thickness of the samples, reported in inches;

"thermal transfer" is the maximum temperature measured at the back side of the test sample during the burn, reported in degrees Fahrenheit; and "thermal shrinkage" is the percent reduction of the length of the sample.

TABLE 1

|  | N | Weight | Thickness | Thermal Transfer | Thermal Shrinkage |
| --- | --- | --- | --- | --- | --- |
| Coating 1 | 24 | 3.42 | 0.026 | 600 | 10-15% |
| Coating 2 | 20 | 3.63 | 0.027 | 424 | none |

It can be seen from Table 1 that Coating 2 performed better than Coating 1 in the burn tests, reducing thermal transfer by 30% and the extent of shrinkage by 10-15%. In addition, the average weight of the fabric coated with Coating 2 was only 6% greater than the average weight of the fabric coated with Coating 1. The use of coatings having nanoclay coatings would thus reduce the rate of flame propagation and provide a flame barrier, while protecting the structural integrity of the coated fabric.

It should be understood that the embodiments described herein are merely exemplary in nature and that a person skilled in the art may make many variations and modifications thereto without departing from the scope of the present invention. All such variations and modifications, including those discussed above, are intended to be included within the scope of the invention as described in the appended claims.

We claim:

1. A flame-retardant fabric, comprising a non-woven textile substrate consisting of cellulosic fibers and thermoplastic polymeric fibers, the substrate having first and second filamentous surfaces opposite each other, each of the first and second filamentous surfaces having a plurality of the cellulosic fibers and thermoplastic polymeric fibers projecting therefrom, and further having interstices among the projecting fibers of the first and second filamentous surfaces, wherein the first filamentous surface of the substrate has a first non-intumescent coating consisting of a solvent, a latex binder and nanoclay particles and optionally a wetting agent, a surfactant and a pigment stabilizer, the first non-intumescent coating being distinct from the substrate and extends along the first filamentous surface and into the interstices thereof, whereby the first non-intumescent coating is integrated with the substrate, and the flame-retardant fabric does not have added flame-retardant chemistry.

2. The flame-retardant fabric of claim 1, wherein the nanoclay particles are selected from the group consisting of a bentonite, a montmorillonite, a hectorite, an illite, and a kaolinite.

3. The flame-retardant fabric of claim 1, wherein the second filamentous surface of the textile substrate has a second non-intumescent coating consisting of a solvent, a latex binder and nanoclay particles and optionally a wetting agent, a surfactant and a pigment stabilizer, the second non-intumescent coating being distinct from the substrate and extends along the second filamentous surface and into the interstices thereof, whereby the second intumescent coating is integrated with the substrate.

4. The flame retardant fabric of claim 3, wherein the solvent of the first non-intumescent coating and the solvent of the second non-intumescent coating are each water.

5. The flame-retardant fabric of claim 1, wherein the nanoclay particles are present in the flame-retardant fabric in an amount in the range of about 0.005% to about 20% by weight of the flame-retardant fabric.

6. The flame-retardant fabric of claim 1, wherein the nanoclay particles are present in the flame-retardant fabric in an amount in the range of about 0.005% to about 10% by weight of the flame-retardant fabric.

7. The flame-retardant fabric of claim 1, wherein the nanoclay particles are present in the flame-retardant fabric in an amount in the range of about 1% to about 5% by weight of the flame-retardant fabric.

8. The flame-retardant fabric of claim 1, wherein the nanoclay particles are present in the flame-retardant fabric in an amount in the range of about 1% to about 3% by weight of the flame-retardant fabric.

9. The flame retardant fabric of claim 1, wherein the fabric has a weight in the range of 2 through 8 ounces per square yard.

10. The flame retardant fabric of claim 1, wherein the fabric has a weight in the range of about 3.4 to about 3.6 ounces per square yard.

11. The flame retardant fabric of claim 1, wherein the solvent is water.

12. A method of making a flame-retardant fabric of claim 1, the method comprising the steps of:
   providing the textile substrate;
   providing the first intumescent coating as a flowable coating material including the nanoclay particles in an amount in the range of about 1% to about 30% by weight of the flowable coating material; and
   applying the flowable coating material to the first surface of the textile substrate such that the flowable coating material forms the first intumescent coating.

13. The method of claim 12, wherein the applying step is performed using a foam coating process.

14. The method of claim 12, wherein the applying step is performed using a spray-coating process.

15. The method of claim 12, wherein the applying step is performed using a dip coating process.

16. The method of claim 12, wherein the applying step is performed using a slot coating process.

17. The method of claim 12, wherein the applying step includes the step of driving off the liquid carrier from the first coating.

* * * * *

UNITED STATES PATENT AND TRADEMARK OFFICE
CERTIFICATE OF CORRECTION

PATENT NO.       : 10,260,195 B1
APPLICATION NO.  : 14/877611
DATED            : April 16, 2019
INVENTOR(S)      : Christopher Keith Martin and Aneta Konior Page 1 of 1

It is certified that error appears in the above-identified patent and that said Letters Patent is hereby corrected as shown below:

In the Claims

Column 9, Line 9, delete "providing the first intumescent coating as a flowable" and insert
-- providing the first non-intumescent coating as a flowable --

Column 9, Line 15, delete "material forms the first intumescent coating." and insert -- material forms the first non-intumescent coating. --

Signed and Sealed this
Twentieth Day of October, 2020

Andrei Iancu
*Director of the United States Patent and Trademark Office*